US006397524B1

(12) United States Patent
Sakaguchi et al.

(10) Patent No.: US 6,397,524 B1
(45) Date of Patent: Jun. 4, 2002

(54) DOOR GLASS RAISING AND FALLING APPARATUS (75) Inventors: Masatoshi Sakaguchi, Fukuoka; Toshiaki Uchikata; Koji Ishii, both of Aichi, all of (JP)

(73) Assignees: Mitsubishi Jidosha Kogyo Kabushiki Kaisha, Tokyo; Ansei Corporation, Aichi Pref., both of (JP)

( * ) Notice: Subject to any disclaimer, the term of this patent is extended or adjusted under 35 U.S.C. 154(b) by 0 days.

(21) Appl. No.: 09/593,706

(22) Filed: Jun. 15, 2000

(30) Foreign Application Priority Data

Jun. 16, 1999 (JP) ............................................. 11-169677
Jun. 16, 1999 (JP) ............................................. 11-169679

(51) Int. Cl.[7] .................................................. B60J 1/16
(52) U.S. Cl. .............................. 49/375; 49/352; 49/502
(58) Field of Search ........................ 49/352, 348, 349, 49/374, 375, 502

(56) References Cited

U.S. PATENT DOCUMENTS

| 4,246,726 A | * | 1/1981 | Breaz et al. ............... 49/352 X |
| 4,442,633 A | * | 4/1984 | Gianotti ........................ 49/375 |
| 5,070,648 A | * | 12/1991 | Moriyama .................... 49/352 |
| 5,502,926 A | * | 4/1996 | Grace et al. .................. 49/375 |
| 5,555,677 A | * | 9/1996 | DeRees et al. ............ 49/352 X |
| 5,809,695 A |   | 9/1998 | Strickland |
| 5,966,872 A | * | 10/1999 | Wasek et al. ................. 49/375 |

FOREIGN PATENT DOCUMENTS

| GB | 1407082 | * | 9/1975 | ................... 49/352 |
| JP | 3129077 | * | 6/1991 | ................... 49/352 |

* cited by examiner

Primary Examiner—Jerry Redman
(74) Attorney, Agent, or Firm—Sughrue Mion, PLLC (57) ABSTRACT A door glass raising and falling apparatus has a carrier plate 71 mounted onto a door glass 70. The door glass 70 is movable along sashes 41, 42 disposed on a door. The carrier plate 71 includes securing portions that are fixed to moving portions 67a, 67b of a wire-rope body 67. The carrier plate 71 also has a glass support portion 74 for supporting the door glass 70, and a pair of front and rear glass fixing portions 77, 78 each including a screw member 75. The door glass 70 has mounting holes supported by the glass fixing portions 77, 78, respectively. The dimension of the mounting holes is larger than the outside diameter of the shaft portion of each of the screw members 75 so that the door glass 70 is moveable with respect to the carrier plate 71. Also, a wire-rope body 150 extends over a plurality of pulleys. Some of the pulleys 142, 143 are rotatably mounted on frame members 136, 137 by pulley shafts 182 respectively. Rubber stoppers 184 are mounted on the pulley shafts 182, to limit the falling distance of the glass rising and falling body 162.

6 Claims, 7 Drawing Sheets

DOOR GLASS RAISING AND FALLING APPARATUS

BACKGROUND OF THE INVENTION

1. Field of the Invention

The present invention relates to a door glass raising and falling apparatus and, in particular, to a door glass raising and falling apparatus suitable for use in a car.

2. Description of the Related Art

Conventionally, in a vehicle such as a car, various kinds of door glass raising and falling apparatus for raising and falling a door glass have been proposed and put to practical use.

For example, in JP-A-10-102902 (Related art 1), there is disclosed a structure in which a door glass is slidably supported by front and rear sashes, carrier plates are secured to a pair of front and rear wire-rope moving portions, and the front and rear portions of the door glass are supported by the carrier plates.

Also, in JP-A-11-44151 (Related art 2), there is disclosed a structure in which the front and rear portions of a door glass are respectively supported by a pair of front and rear glass support members which are respectively secured to a pair of front and rear wire-rope moving portions, and the door glass is raised and fallen along a pair of front and rear guide rails which are respectively disposed so as to extend in the vertical direction.

In the door glass raising and falling apparatus according to the related art 1, in a state before the door glass is assembled to the pair of front and rear carrier plates, not only the front and rear carrier plates can be rotated around the axes of their associated wire ropes independently and can be moved relatively freely in the back-and-forth direction of a door as well as in the deep direction of the door, but also the door glass is easy to incline in the vertical direction when the door glass is viewed from the side surface thereof. To assemble the door glass to the front and rear carrier plates in such unstable state, an operator must match the position and attitude of one carrier plate to the door glass before the one carrier plate is assembled to the door glass and, after then, the other carrier plate must be assembled to the door glass similarly, with the result that it takes time and labor to assemble the door glass to the front and rear carrier plates.

On the other hand, in the door glass raising and falling apparatus according to the related art 2, when the door glass rises and falls along the vertically extending guide members, the front and rear end edges of the door glass move in the vertical direction along the front and rear sashes of the door and, therefore, in case where the guide plates are not arranged parallel to the sashes with accuracy, unfavorably, not only the door glass cannot be raised and fallen smoothly, but also an excessive stress is applied to the door glass. Further, since there are required two fairly long guide members, not only the number of parts is large but also there is a disadvantage in reducing the weight of the door glass raising and falling apparatus.

SUMMARY OF THE INVENTION

It is an object of the invention to provide a door glass raising and falling apparatus which is simple in structure and easy to assemble.

In attaining the above object, according to a first aspect of the invention, there is provided a door glass raising and falling apparatus, in which the lower end portion of a door glass is supported by a carrier plate extending in the back-and-forth direction of the door glass, and, by raising and falling the front and rear moving portions of a wire-rope body using a motor, the door glass can be moved in the vertical direction while it is guided along sashes respectively disposed in the front and rear portions of a door. The carrier plate includes a pair of front and rear securing portions respectively formed at given portions thereof. That is, the carrier plate can be mounted on the front and rear moving portions of the wire-rope body in a stable manner through the pair of front and rear securing portions thereof, while assembling of the door glass to the carrier plate is also easy.

Also, according to a second aspect of the invention, there is provided a door glass raising and falling apparatus, in which, to adjust the attitude of a door glass, before the screw members disposed in the glass fixing portions of a carrier plate are tightened, the door glass is raised toward an upper sash provided in a door. Since the door glass can be inclined in the vertical direction along the surface of the door glass with the glass support portion of the carrier plate as the fulcrum thereof, at the time when the upper edge of the door glass is pressed against the upper sash, the attitude of the door glass can be adjusted automatically in such a manner that the whole upper edge of the door glass can be contacted uniformly with the upper sash. In this state, by tightening the screw members, the door glass can be fixed to the sash and carrier plate in its normal attitude. In this case, in case where the glass support portion is situated below the center of gravity of the door glass, in the above attitude adjustment, the door glass can be inclined easily with the glass support portion as the fulcrum thereof, thereby being able to facilitate the adjustment of the attitude of the door glass.

Further, according to a third aspect of the invention, there is provided a door glass raising and falling apparatus, in which, when a door glass reaches its bottom dead center, a glass rising and falling body is contacted with rubber stoppers respectively disposed in their associated pulley shafts, so that the glass raising and falling body is made to stop while compressing the rubber stoppers. At the then time, the glass rising and falling body is supported through the rubber stoppers by the pulley shafts. That is, since a power transmission passage for receiving the glass rising and falling body consists substantially only of the pulley shafts, the power transmission passage is very short. And, a force applied in the rubber stopper depressing direction and a force applied in the pulley raising direction, that is, a force for driving the wire-rope body upwardly cancel each other through the pulley shafts, which makes it possible to stop the glass rising and falling body positively.

DETAILED DESCRIPTION OF THE PRESENT INVENTION

Now, description will be given below of a vehicle door including a door glass raising and falling apparatus according to a first embodiment of the invention with reference to FIGS. 1 to 7.

Figure 2:
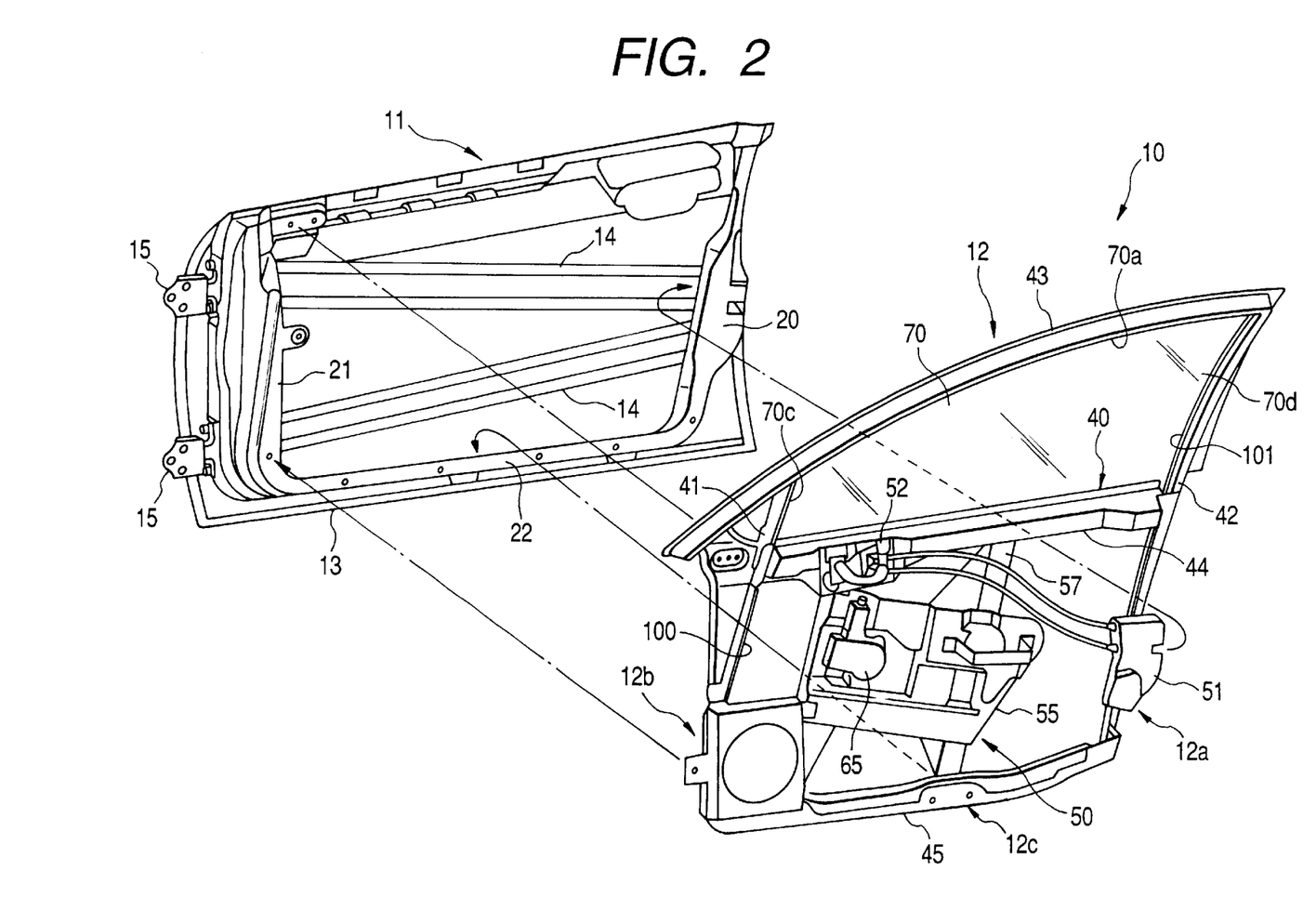
FIG. 2 is an exploded perspective view of a vehicle door including the door module shown in FIG. 1, when it is viewed from inside the vehicle.

A car door 10 shown in FIG. 2 comprises a door panel unit 11 and a door module 12. The door panel unit 11 includes an outer panel 13 forming the outer wall surface of the door 10, reinforcing members 14 respectively provided on the inside of the vehicle for reinforcement of the outer panel 13, hinge members 15 respectively used to mount the door 10 onto a vehicle body, and inner panels 20, 21, 22 respectively provided on the peripheral edge portion (which is situated on the inside of the vehicle) of the outer panel 13.

Figure 1:
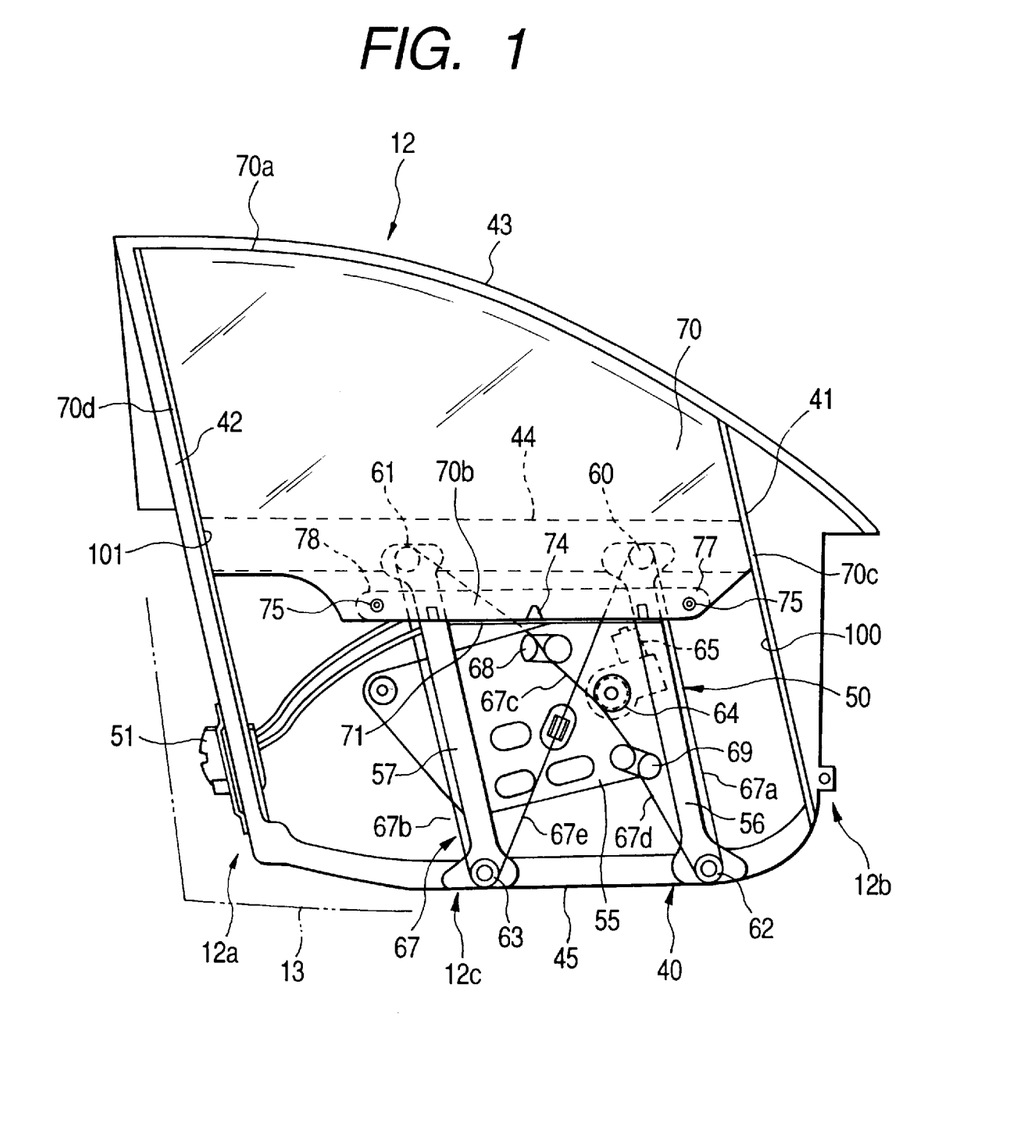
FIG. 1 is a side view of a door module including a door glass raising and falling apparatus according to a first embodiment of the invention, when it is viewed from outside a vehicle.

On the other hand, the door module 12, as shown in FIG. 1, comprises a frame structure 40 which constitutes the skeleton of the door module 12. Since FIG. 1 is a side view of the door module 12 when it is viewed from outside the vehicle, in FIG. 1, the right and left position relation is reversed with respect to FIGS. 2 and 3. The frame structure 40 is composed of a front sash 41 which is situated on the front side of the vehicle, a rear sash 42 which is situated on the rear side of the vehicle, an upper sash 43 which is situated in the upper-most portion of the door module 12, an intermediate frame 44 which is situated below of the upper sash 43 and extends in the horizontal direction, and a lower frame 45 situated in the lower-most portion of the door module 12. The upper sash 43 has a shape which extends along the upper edge 70a of a door glass 70 which will be discussed later.

Figure 3:
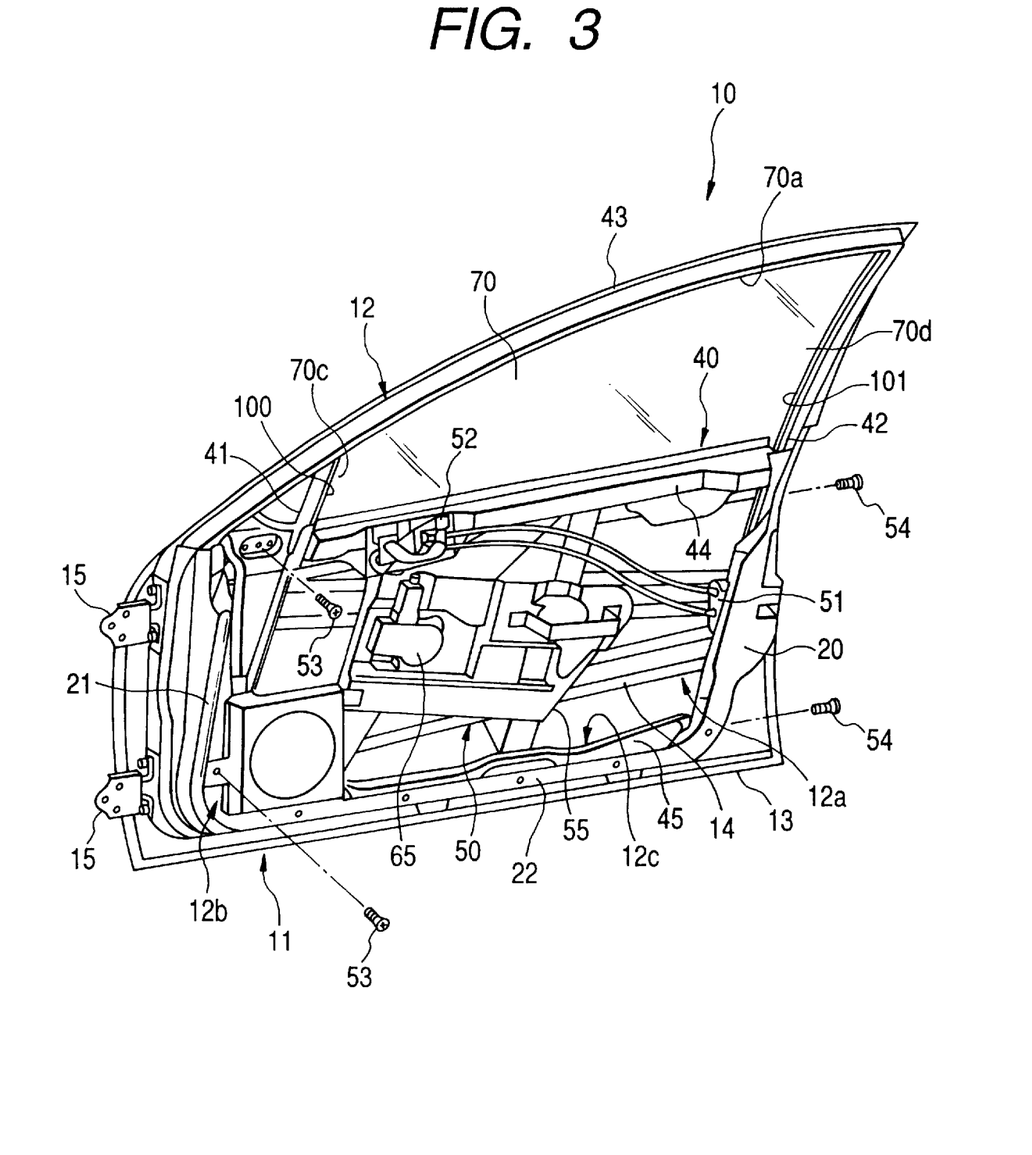
FIG. 3 is a perspective view of the door module shown in FIG. 2, showing a state thereof in which it is inserted into a door panel.

As shown in FIGS. 1 to 3, on the frame structure 40, there are mounted a door glass raising and falling mechanism 50, a door latch mechanism 51, and a latch operation mechanism (door inside handle) 52. The sashes 41, 42, 43, door glass raising and falling mechanism 50, and door glass 70 cooperate together in forming a door glass raising and failing apparatus according to the invention.

To assemble the door module 12 into the door panel unit 11, the rear end portion 12a of the door module 12 maybe firstly inserted into between the outer panel 13 and rear inner panel 20, and, after then, the front end portion 12b of the door module 12 may be moved from inside the vehicle in a direction where it can be superimposed on the front inner panel 21 of the door panel unit 11, so that, as shown in FIG. 3, the lower end portion 12c of the door module 12 is dropped into between the outer panel 13 and lower inner panel 22. And, the front end portion 12b of the door module 12 may be fixed using a bolt 53 and the rear end portion 12a of the door module 12 may be fixed to the door panel unit 11 using a bolt 54.

As shown in FIG. 1, the door glass raising and falling mechanism 50 comprises a base plate 55 interposed between the intermediate frame 44 and lower frame 45, and a pair of front and rear frames 56, 57 which are fixed to the base plate 55 and extend in the vertical direction. The lower end portions of the frames 56, 51 are respectively fixed to the lower frame 45. On the upper and lower end portions of the frames 56, 57, there are disposed upper pulleys 60, 61 and lower pulleys 62, 63, respectively. Also, on the base plate 55, there are disposed a drive pulley 64 and a motor 65 for rotating the drive pulley 64. The motor 65 is a DC motor with a reduction gear which can be operated on an on-board battery (not shown) and can be rotated forwardly and reversely.

On and over these pulleys 60–64, there is wound a wire-rope body 67 composed of a wire cable such that it crosses itself in an X-shaped manner. That is, the wire-rope body 67 includes a front-side moving portion 67a drawn in the vertical direction between the front-side upper and lower pulleys 60 and 62, a rear-side moving portion 67b drawn in the vertical direction between the rear-side upper and lower pulleys 61 and 63, a first slanting portion 67c drawn slantingly between the upper pulley 61 and drive pulley 64, a second slanting portion 67d drawn slantingly between the lower pulley 62 and drive pulley 64, and a third slanting portion 67e drawn slantingly between the upper pulley 60 and lower pulley 63.

And, the first and second slanting portions 67c, 67d cross the third slanting portion 67e in an X-shaped manner. In the first and second slanting portions 67c, 67d, there are disposed tension members 68, 69 which apply proper tensile forces to the whole wire-rope body 67 to thereby absorb the extension and loosening of the wire-rope body 67.

A carrier plate 71 for supporting the door glass 70 is fixed to the respective vertical-direction intermediate portions of the front-side and rear-side moving portions 67a and 67b in such a manner that the carrier plate 71 extends substantially in the horizontal direction. The details of the door glass 70 and carrier plate 71 will be discussed later.

One end side of the wire-rope body 67, that is, the end portion of the first slanting portion 67c is secured to the drive pulley 64, and the first slanting portion 67c of the wire-rope body 67 is wound on the drive pulley 64 by the length thereof that allows the rising and falling stroke of the door glass 70. The other end side of the wire-rope body 67, that is, the end portion of the second slanting portion 67d is also secured to the drive pulley 64, and the second slanting portion 67d of the wire-rope body 67 is wound on the drive pulley 64 by the length thereof that allows the rising and falling stroke of the door glass 70.

Figure 4:
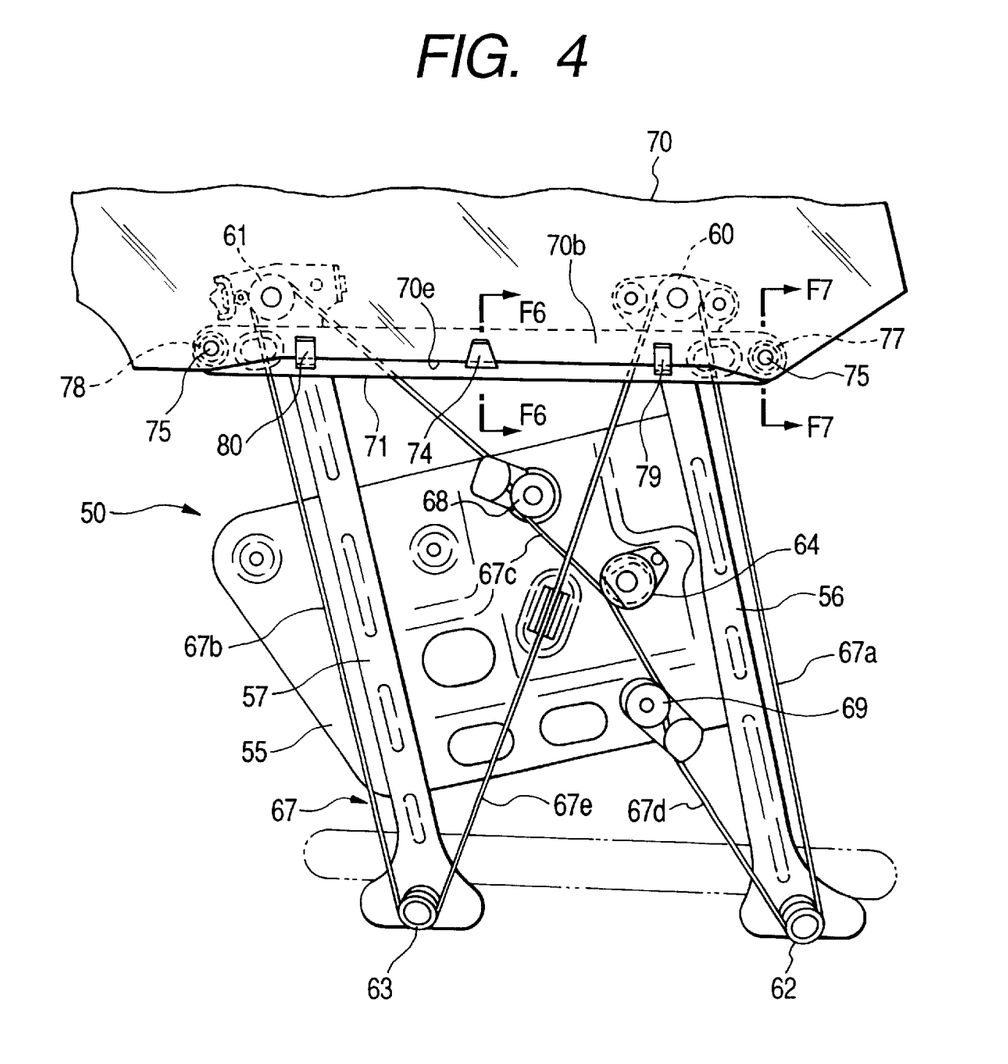
FIG. 4 is a side view, enlarged in part, of the door raising and falling apparatus included in the door module shown in FIG. 1.

Therefore, when the drive pulley 64 is rotated clockwise in FIG. 4, the first slanting portion 67c of the wire-rope body 67 is played out from the drive pulley 64 and, at the same time, the second slanting portion 67d of the wire-rope body 67 is taken up onto the drive pulley 64, thereby causing the two moving portions 67a, 67b of the wire-rope body 67 to move down in synchronism with each other, so that the carrier plate 71 and door glass 70 are moved down integrally with each other. On the other hand, when the drive pulley 64 is rotated counterclockwise, the first slanting portion 67c of the wire-rope body 67 is taken up onto the drive pulley 64 and, at the same time, the second slanting portion 67d of the wire-rope body 67 is played out from the drive pulley 64, thereby causing the two moving portions 67a, 67b of the wire-rope body 67 to move up in synchronism with each other, so that the carrier plate 71 and door glass 70 are moved up integrally with each other.

Figure 5:
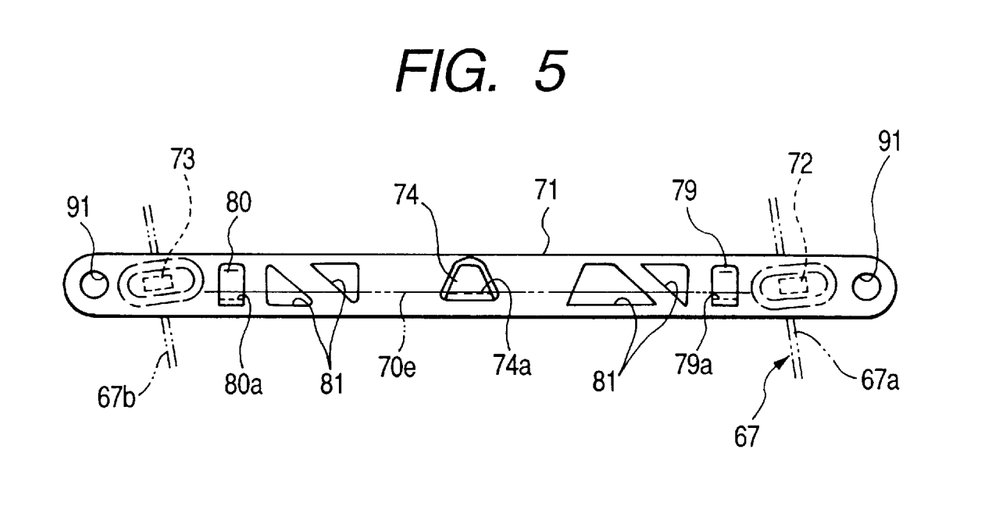
FIG. 5 is a front view of a carrier plate used in the door raising and falling apparatus shown in FIG. 4.

As shown in FIGS. 4 and 5, the carrier plate 71 extends in the back-and-forth direction of the door glass 70 along the lower end 70e of the door glass 70 and, in the given portions of the carrier plate 71 (for example, in the two front and rear portions of the carrier plate 71), there are formed securing portions 72, 73 which are used to fix the two moving portions 67a, 67b of the wire-rope body 67. Also, in the intermediate portion of the carrier plate 71 in the longitudinal direction thereof, there is formed a glass support portion 74. The glass support portion 74 is situated below the center of gravity of the door glass 70.

Figure 7:
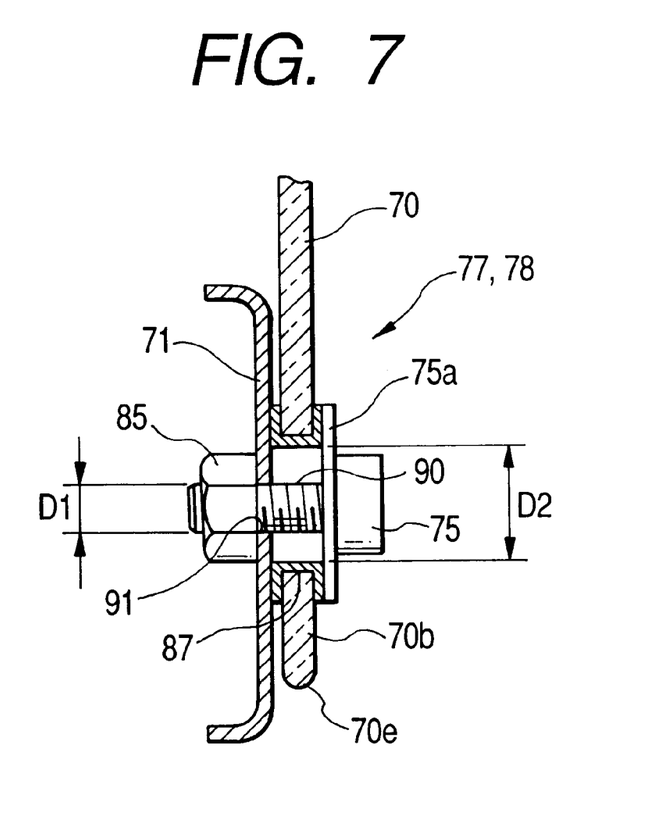
FIG. 7 is a section view taken along the line F7—F7 shown in FIG. 4.

In the two end portions of the carrier plate 71, there are formed glass fixing portions 77, 78 respectively including screw members 75 (shown in FIG. 7). Also, between the glass support portion 74 and these two glass fixing portions 77, 78, there are formed auxiliary support portions 79, 80, respectively. In the proper portions of the carrier plate 71, there are formed thickness reducing holes 81 which are punched out by pressing so as to reduce the weight of the carrier plate 71.

Figure 6:
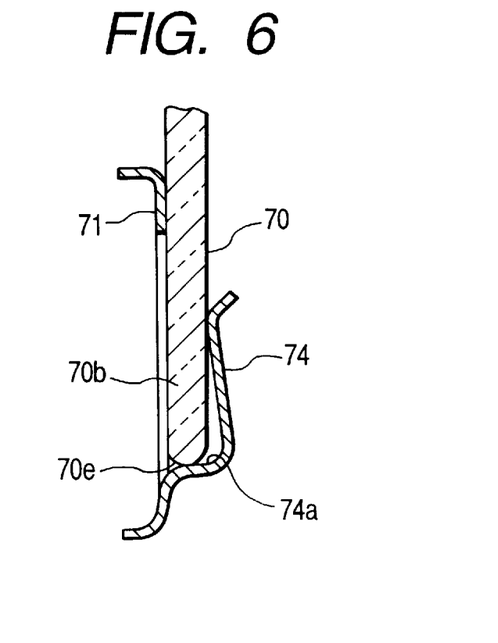
FIG. 6 is a sectional view taken along the line F6—F6 shown in FIG. 4.

As shown in FIG. 6, the glass support portion 74 is formed by cutting and raising part of the carrier plate 71 into a hook-like shape facing upwardly; and, by inserting the lower end portion 70b of the door glass 70 from above the glass support portion 74, the lower end 70e of the door glass 70 can be supported from below by the bottom surface 74a of the glass support portion 74.

The auxiliary support portions 79, 80 are formed by cutting and raising part of the carrier plate 71 into hook-like shapes facing upwardly, and they are able to hold the door glass 70 between them in the glass thickness direction. The bottom surfaces 79a, 80a of the auxiliary support portions 79, 80 are respectively situated at positions lower than the bottom surface 74a of the glass support portion 74. Thanks to this, the lower end 70e of the door glass 70 is held such that it floats up slightly from the bottom surfaces 79a, 80a of the auxiliary support portions 79, 80; and, therefore, substantially, only the bottom surface 74a of the glass support portion 74 can be contacted with the lower end 70e of the door glass 70.

The door glass 70 and carrier plate 71 are respectively fixed in the above-mentioned two glass fixing portions 77, 78 by the screw members 75 (such as bolts) and nuts 85 (shown in FIG. 7). Each screw member 75 includes a shaft portion 90 to be inserted into a mounting hole 87 formed in the door glass 70, and the nut 85 can be threadedly engaged with a male screw formed on the shaft portion 90.

The vertical-direction dimension D2 of the mounting hole 87 is sufficiently larger than the outside diameter D1 of the shaft portion 90 of the screw member 75, which allows the door glass 70 to move in the vertical direction with respect to the carrier plate 71 by a distance corresponding to the difference between the dimensions D2 and D1. In case where the shaft portion 90 of the screw member 75 is inserted into the mounting hole 87 and into a hole 91 formed in the carrier plate 71 and the nut 85 is threadedly engaged with the shaft portion 90 to thereby tighten the same, the door glass 70 can be held in the thickness direction thereof by and between the seat surface 75a of the screw member 75 and carrier plate 71.

As shown in FIG. 1, the front edge portion 70c of the door glass 70 is in contact with a weather strip 100 disposed in the front sash 41 of the door module 12 in such a manner that the front edge portion 70c can be freely slided in the vertical direction. Also, the rear edge portion 70d of the door glass 70 is in contact with a weather strip 101 disposed in the rear sash 42 of the door module 12 in such a manner that the rear edge portion 70d can be freely slided in the vertical direction. That is, as the carrier plate 71 rises and falls, the door glass 70, while maintaining its close contact with the weather strips 100, 101, is guided along the pair of front and rear sashes 41, 42 and is thereby moved up and down.

Now, description will be given below of the procedure for fixing the door glass 70 to the carrier plate 71.

By inserting the lower end portion 70b of the door glass 70 into the glass support portion 74 and two auxiliary support portions 79, 80, the lower end 70e of the door glass 70 is supported by the bottom surface 74a of the glass support portion 74. In this operation, the screw members 75 of the glass fixing portions 77, 78 and nuts 85 are not tightened together but are held in a state where the door glass 70 is able to move in the vertical direction to a certain degree with respect to the carrier plate 71. And, the motor 65 is rotated in a direction where the door glass 70 can be raised, thereby raising the door glass 70 fully to the upper sash 43.

Due to this, the upper edge 70a of the door glass 70 is contacted with the upper sash 43. At the then time, because the screw members 75 of the glass fixing portions 77, 78 are respectively loosened, the door glass 70 can be moved in the vertical direction along the surface of the door glass 70 with the glass support portion 74 as the fulcrum thereof; and, therefore, in case where the upper edge 70a of the door glass 70 is pressed against the upper sash 43, the attitude (the vertical-direction inclination along the glass surface) of the door glass 70 can be adjusted automatically in such a manner that the whole upper edge 70a of the door glass 70 can be contacted with the upper sash 43 with no clearance between them.

In this state, that is, in a state where the attitude of the door glass 70 is adjusted, by tightening the nuts 85 against the screw members 75 in the glass fixing portions 77, 78, the door glass 70 can be fixed to the carrier plate 71. After the door glass 70 is fixed to the carrier plate 71 in this manner, even in case where the door glass 70 is moved down, the attitude of the door glass 70 can be maintained in the normal state that is obtained after the adjustment thereof; and, therefore, in case where the door glass 70 is raised again up to the fully closed position thereof, the upper edge 70a of the door glass 70 can be contacted with the upper sash 43 uniformly with no clearance between them.

Figure 8:
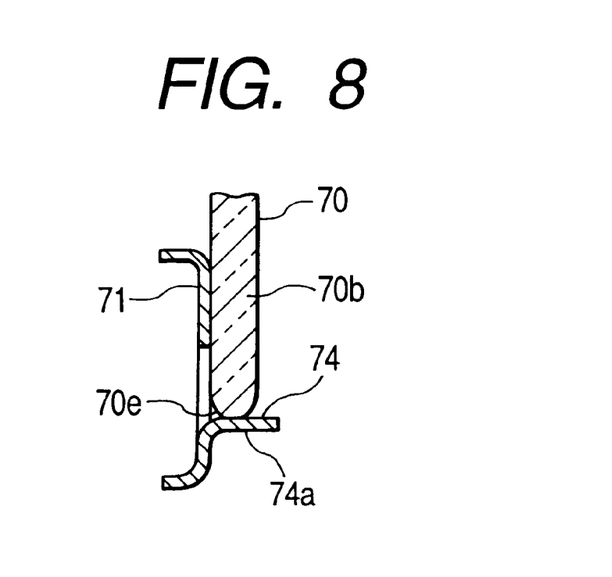
FIG. 8 is a section view of a carrier plate according to a second embodiment of the invention.

By the way, as in a second embodiment of the carrier plate 71 shown in FIG. 8, the glass support portion 74 may also be formed so as to have a shape which can support the lower end 70e of the door glass 70 simply from below. Also, in carrying out the invention, of course, the respective elements of the invention including not only the door glass and carrier plate but also the glass support portion, glass fixing portions, mounting hole, wire-rope body and sashes can be changed properly.

Figure 9:
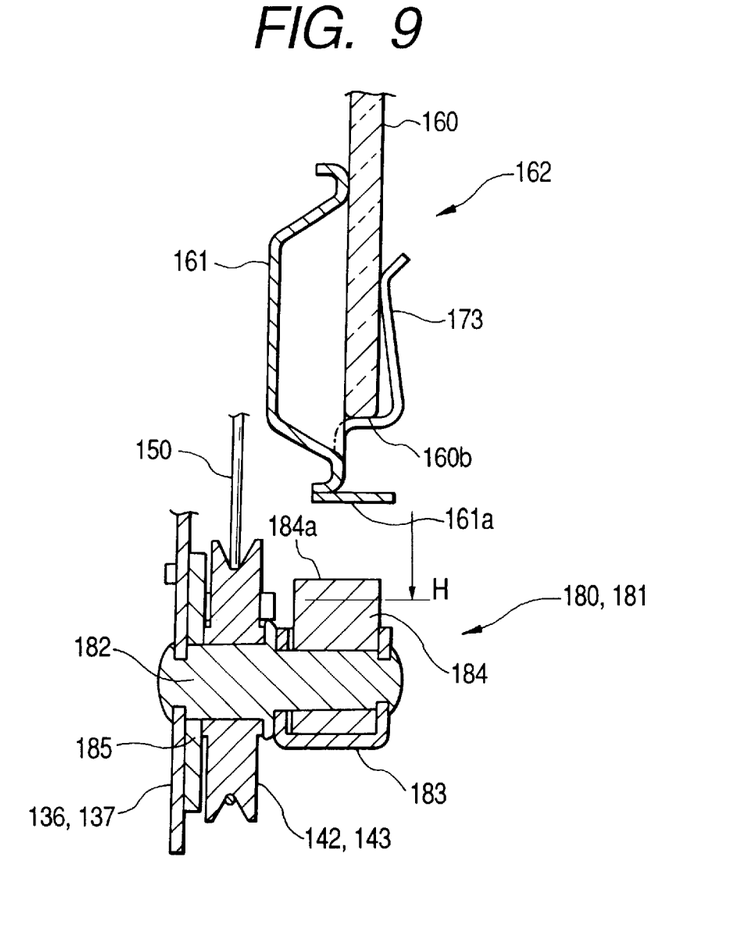
FIG. 9 is a section view of a pulley unit and part of a glass rising and falling body according to a third embodiment of the invention.
Figure 10:
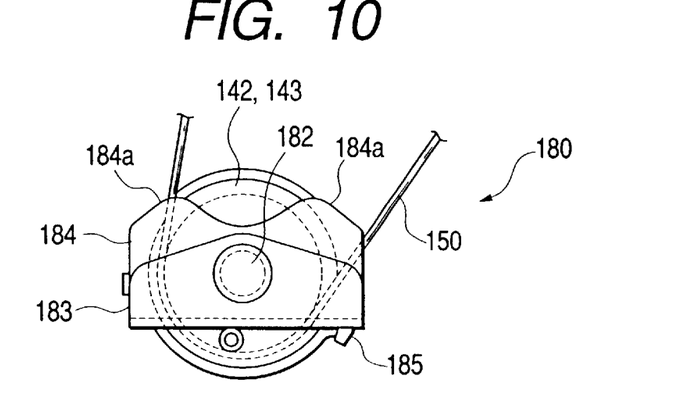
FIG. 10 is a front view of the pulley unit shown in FIG. 9.

Next, description will be given below of a third embodiment of a door glass raising and falling apparatus according to the invention with reference to FIGS. 9 and 10.

In the present embodiment, on the lower portion of the door glass raising and falling apparatus, there are disposed pulley units 180, 181 which respectively include the above-mentioned pulleys 142, 143. Referring to the structure of these pulley units 180, 181, as shown in FIG. 9 in which one of them is illustrated as their representative, each pulley unit comprises two pulley shafts 182 respectively fixed to two frame members 136, 137, two pulleys 142, 143 respectively mounted on their associated shaft 182 in a freely rotatable manner, a stopper bracket 183 mounted on the pulley shaft 182, a rubber stopper 184 held by the stopper bracket 183, and a guide member 185 for guiding the winding of a wire-rope body 150. The stopper bracket 183 is molded in a shape which is capable of wrapping the lower portion side of the rubber stopper 184. The upper surface 184a of the rubber stopper 184 shown in FIG. 10 may be formed corrugated. However, the rubber stopper 184 may have other suitable shapes such as a circular shape.

The rubber stopper 184 is situated at a position which is just below and opposed to the lower end surface 161a of a carrier plate 161. That is, when a door glass 160 moves down to a given position, that is, the vicinity of the falling end thereof, the lower end surface 161a of the carrier plate 161, namely, the lower end face of a glass raising and falling body 162 can be contacted with the upper surface 184a of the rubber stopper 184.

What is claimed is:

1. A door glass raising and falling apparatus, comprising:
   a door glass moveable along sashes respectively disposed in front and rear portions of a door;
   only one carrier, which is a unitary body, extending in a back-and-forth direction of the door glass, the carrier mounted on a lower end portion of the door glass, the carrier having a plurality of securing portions each formed at a predetermined portion; and
   a wire-rope body including a pair of front and rear moving portions fixed to the plurality of securing portions, the front and the rear moving portions drivable in synchronism with each other in a direction to raise and lower the door glass.

2. The door glass raising and falling apparatus as set forth in claim 1, wherein the carrier comprises:
   a glass support portion for supporting a part of the lower edge portion of the door glass;
   a front screw member and a rear screw member;
   two door glass holes and two carrier holes respectively defined in the door glass and the carrier,
   wherein the front screw member is inserted into one of the two door glass holes and one of the two carrier holes, the rear screw member is inserted into the other of the two door glass holes and the other of the two carrier holes,
   wherein the dimension of each of the two door glass holes is larger than the outside diameter of a shaft portion of each of the front and the rear screw members to thereby allow the door glass to move with respect to the carrier, and, in a state where the door glass is raised up to the position of an upper sash of the door, the front and the rear screw members are tightened to thereby fix the door glass to the carrier.

3. The door glass raising and falling apparatus as set forth in claim 2, wherein the glass support portion is disposed below a center of gravity of the door glass.

4. The door glass raising and falling apparatus as set forth in claim 2, wherein the glass support portion is disposed proximate to the middle portion of the door glass in the back-and-forth direction thereof.

5. The door glass raising and falling apparatus as set forth in claim 2, wherein the carrier comprises a glass auxiliary support portion,
   wherein a clearance is formed between the lower edge portion of the door glass and the glass auxiliary support portion under a condition that the door glass is supported by the glass support portion.

6. The door glass raising and falling apparatus as set forth in claim 2, wherein the carrier is formed by a plate and the glass support portion is formed by cutting and raising a part of the carrier into a hook shape.

* * * * *